(12) United States Patent
Liao

(10) Patent No.: US 11,447,990 B2
(45) Date of Patent: Sep. 20, 2022

(54) STRUT FOR KEEPING AN ENGINE HOOD OF A VEHICLE IN A LIFTED POSITION AN ENGINE HOOD

(71) Applicant: Nian-Hao Liao, Taichung (TW)

(72) Inventor: Nian-Hao Liao, Taichung (TW)

( * ) Notice: Subject to any disclaimer, the term of this patent is extended or adjusted under 35 U.S.C. 154(b) by 337 days.

(21) Appl. No.: 16/898,403

(22) Filed: Jun. 10, 2020

(65) Prior Publication Data
US 2021/0388650 A1 Dec. 16, 2021

(51) Int. Cl.
*E05C 17/30* (2006.01)
*B62D 25/12* (2006.01)

(52) U.S. Cl.
CPC .............. *E05C 17/30* (2013.01); *B62D 25/12* (2013.01)

(58) Field of Classification Search
CPC ...... E05C 17/30; E05C 17/345; E05C 17/042; E05C 17/047; E05C 17/12; E05C 17/14
USPC ........... 292/338, 339; 248/352, 354.1, 354.6, 248/357
See application file for complete search history.

(56) References Cited

U.S. PATENT DOCUMENTS

| | | | | |
|---|---|---|---|---|
| 1,701,076 A * | 2/1929 | Kemp | ................... | E05C 19/004 292/6 |
| RE27,161 E * | 8/1971 | Raymon | ............. | E05B 65/0888 292/262 |
| 4,586,579 A * | 5/1986 | Matsui | .................... | E05C 17/14 180/69.21 |
| 4,588,220 A * | 5/1986 | Matsui | .................... | E05C 17/14 292/262 |
| 5,238,213 A * | 8/1993 | Pool | ....................... | E05C 17/047 292/306 |
| 5,992,909 A * | 11/1999 | Vindum | ................ | E05C 17/042 292/288 |
| 6,244,650 B1 * | 6/2001 | Namvari | ................. | E05C 17/14 296/76 |
| 7,410,142 B2 * | 8/2008 | Kurtz | ...................... | E05C 17/30 292/338 |
| 8,141,743 B1 * | 3/2012 | Corrigan | ............... | E05C 17/047 292/288 |
| 2007/0194199 A1 * | 8/2007 | Kurtz | .................... | E05C 17/042 248/352 |
| 2014/0353988 A1 * | 12/2014 | Al Kayali | ............. | E05C 19/004 292/339 |
| 2017/0306667 A1 * | 10/2017 | Mitchell | ................. | E05C 17/30 |
| 2018/0238089 A1 * | 8/2018 | Duvall | .................... | E05C 17/12 |
| 2021/0131154 A1 * | 5/2021 | Cunningham | .......... | E05C 17/16 |

* cited by examiner

Primary Examiner — Jeffrey O'Brien
(74) Attorney, Agent, or Firm — Bruce Stone LLP; Joseph A. Bruce

(57) ABSTRACT

A strut includes a tube and a telescopic device. The tube includes a cavity. The telescopic device includes an anti-skid cap, a rod and an elastic element. The anti-skid cap is formed with an aperture and located on the tube to close the cavity so that the aperture is in communication with the cavity of the tube. The rod is movably inserted in the anti-skid cap and the cavity of the tube. The elastic element biases a section of the rod from the anti-skid cap via the aperture.

8 Claims, 6 Drawing Sheets

STRUT FOR KEEPING AN ENGINE HOOD OF A VEHICLE IN A LIFTED POSITION AN ENGINE HOOD

BACKGROUND OF INVENTION

1. Field of Invention

The present invention relates to an engine hood of a vehicle and, more particularly, to a strut for keeping an engine hood of a vehicle at various angles.

2. Related Prior Art

Cars are necessary tools for transportation in a modern society. A conventional vehicle includes an engine and related components located in an engine compartment normally covered by an engine hood. The engine hood is lifted to allow access to the engine and any of the related components for maintenance or repair. The engine hood is kept in the lifted position by a strut. A conventional strut is a simple rod or a hydraulic strut. The hydraulic strut is expected to automatically lift the engine hood and keep the engine hood in the lifted position. However, the hydraulic strut might be out of order and a spare strut is used instead of the hydraulic strut in such a case. An anti-skid cap is connected to an end of the spare strut to prevent the end of the spare strut from skidding, i.e., to avoid movement of the spare strut out of a proper position. However, the engine hood is heavy so that the anti-skid cap might not effectively avoid skid of the end of the spare strut when the spare strut is hit accidentally. A worker might be hurt by the engine hood should the spare strut is moved out of the proper position.

The present invention is therefore intended to obviate or at least alleviate the problems encountered in the prior art.

SUMMARY OF INVENTION

It is the primary objective of the present invention to provide an engine hood with a reliable strut.

To achieve the foregoing objective, the strut includes a tube and a telescopic device. The tube includes a cavity. The telescopic device includes an anti-skid cap, a rod and an elastic element. The anti-skid cap is formed with an aperture and located on the tube to close the cavity so that the aperture is in communication with the cavity of the tube. The rod is movably inserted in the anti-skid cap and the cavity of the tube. The elastic element biases a section of the rod from the anti-skid cap via the aperture.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
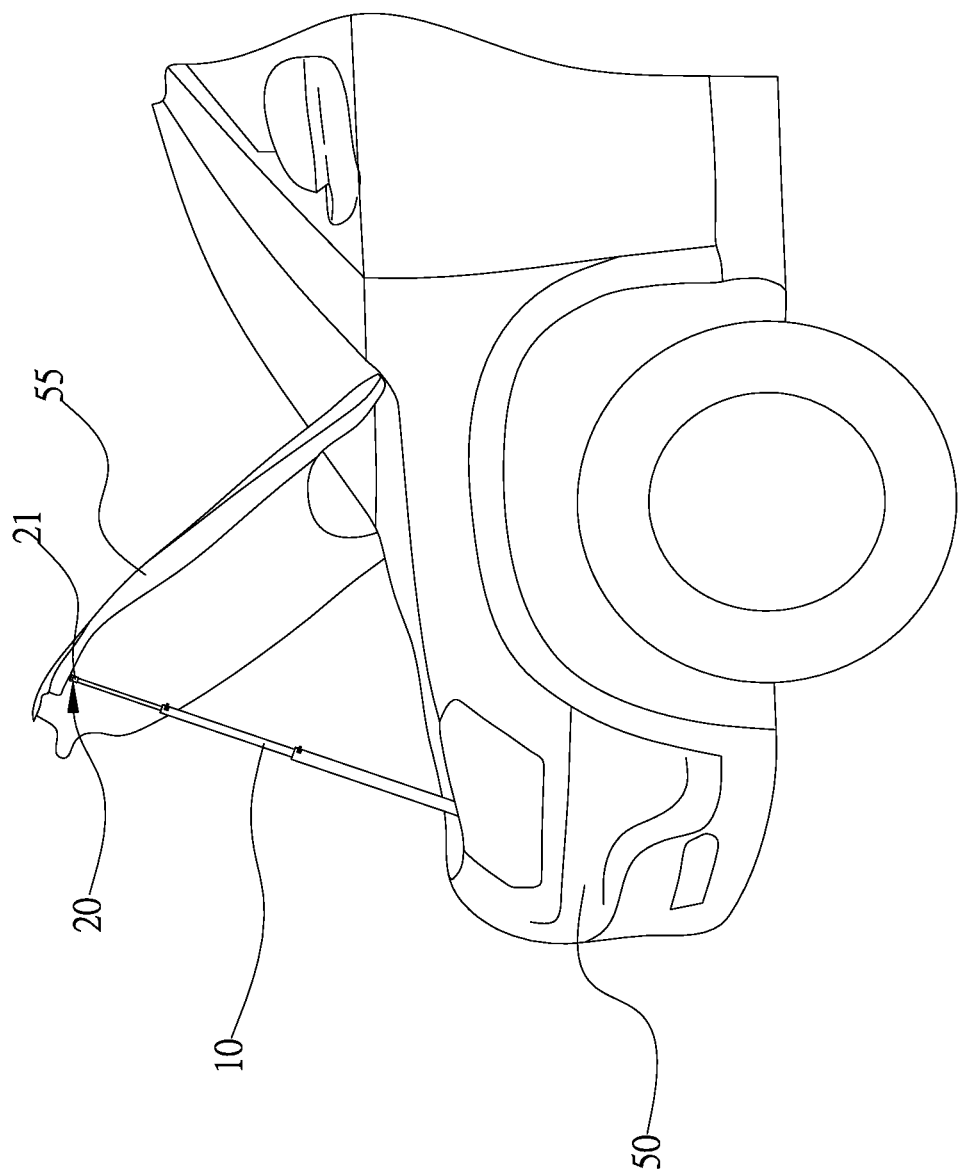
FIG. 1 is a perspective view of an engine hood kept in a lifted position by a strut according to the first embodiment of the present invention.

Referring to FIG. 1, an engine hood 55 of a vehicle 50 is kept in a lifted position by a strut according to a first embodiment of the present invention. The strut includes a tube 10 and a telescopic device 20. The telescopic device 20 is connected to an end of the tube 10.

Figure 2:
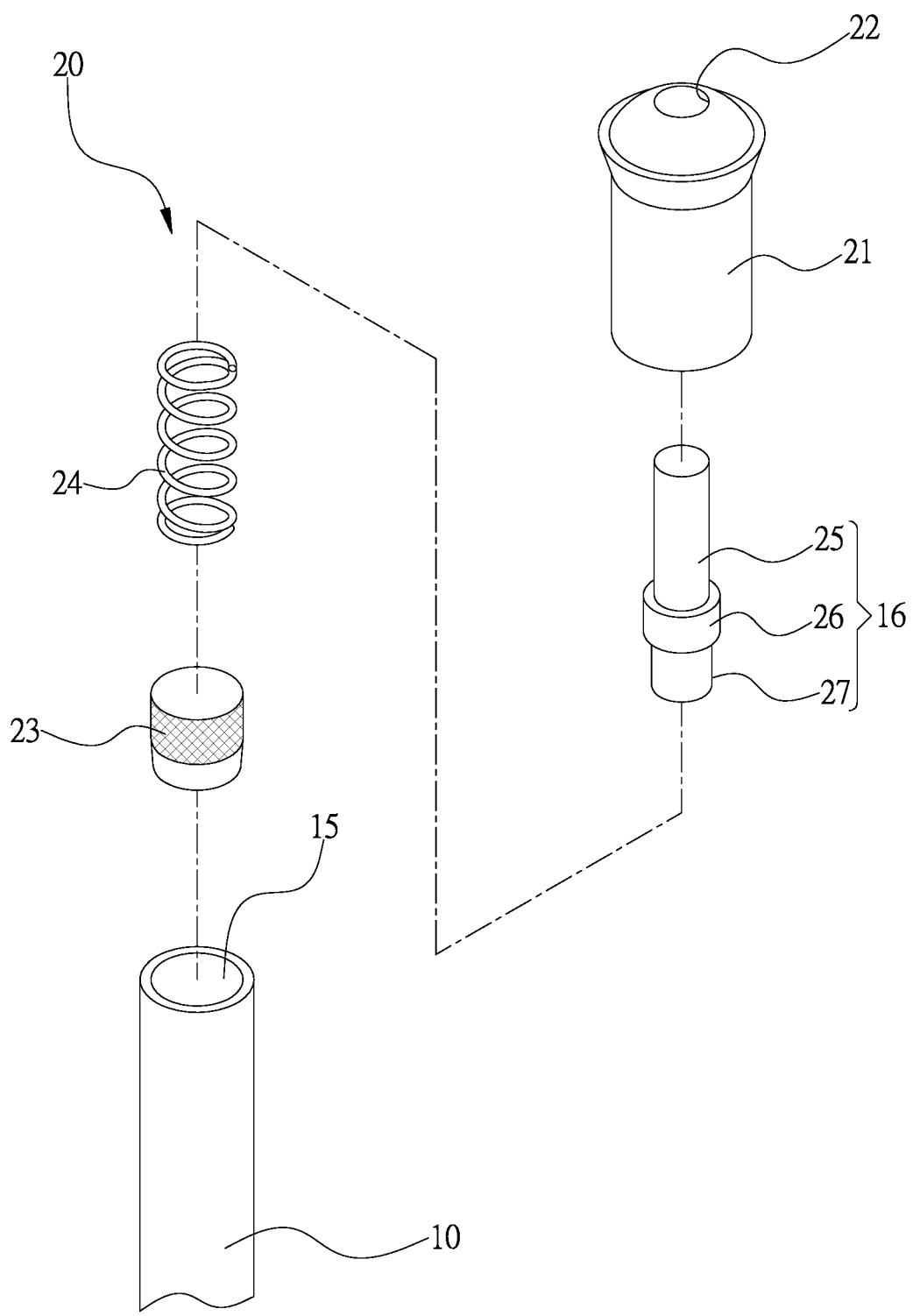
FIG. 2 is an exploded view of the strut shown in FIG. 1.
Figure 3:
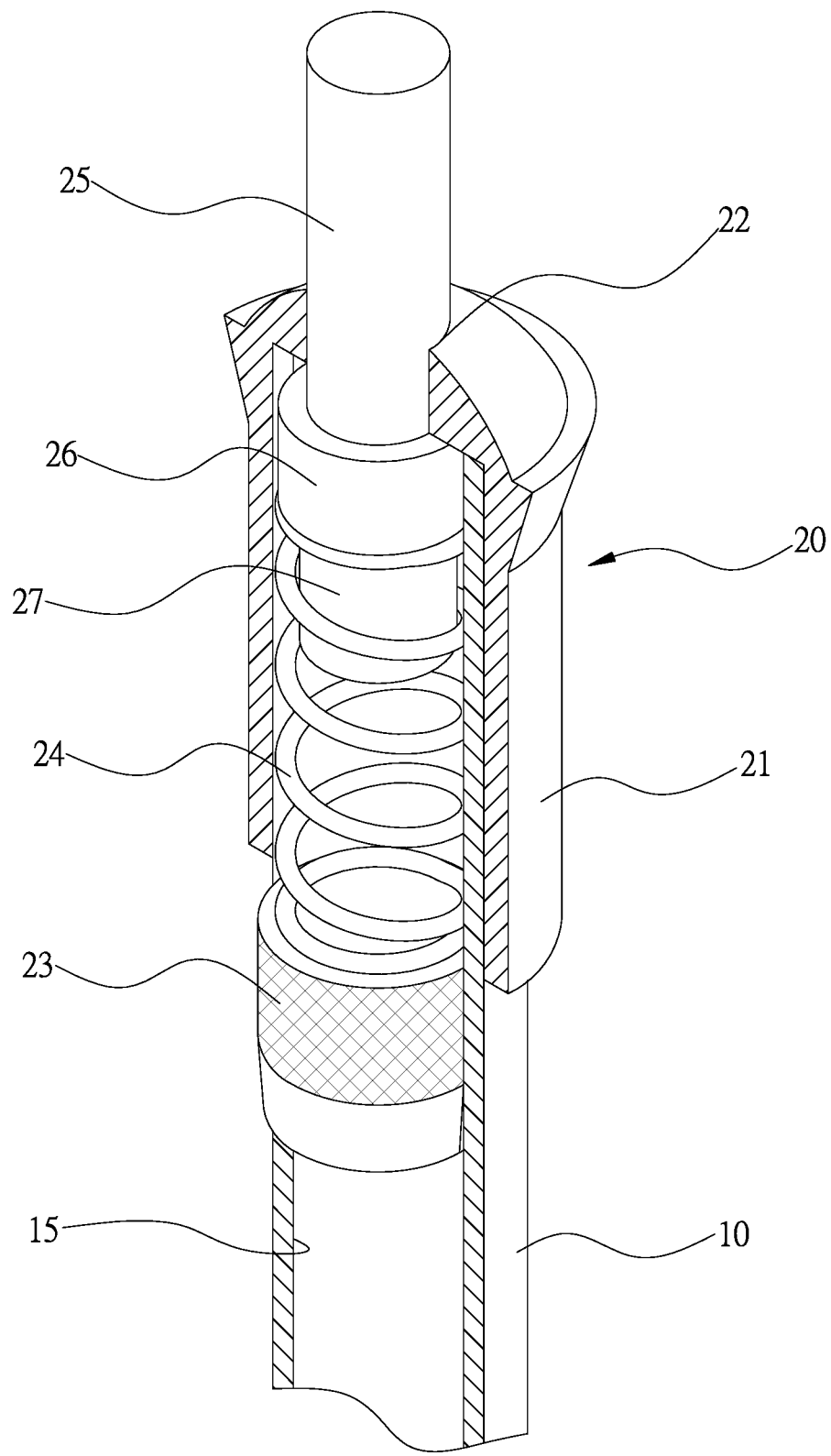
FIG. 3 is a cut-away view of a telescopic device used of the strut shown in FIG. 1.

Referring to FIGS. 2 and 3, the tube 10 can include a single section or several interconnected sections. The tube 10 can be replaced with a solid rod including a single section or several interconnected sections in another embodiment. The tube 10 can be a telescopic element in another embodiment. Preferably, the tube 10 is a telescopic element with a length adjustable to fit various vehicles. The tube 10 includes a cavity 15 axially made in at least one end pointed at the telescopic device 20. Preferably, the telescopic device 20 is connected to an end of the tube 10 pointed at an engine hood 55.

The telescopic device 20 includes a rod 16, an anti-skid cap 21, a plug 23 and an elastic element 24. The anti-skid cap 21 is provided around a section of the tube 10. The anti-skid cap 21 covers the cavity 15 of the tube 10. The anti-skid cap 21 is made with an aperture 22 in communication with the cavity 15. The aperture 22 is made with a diameter smaller than an internal diameter of the anti-skid cap 21.

The rod 16 includes a stop 26 formed between a contact section 25 and a positioning section 27. The stop 26 is in the form of an annular flange extending around the periphery of the rod 16. Selectively, the contact section 25 extends out of the anti-skid cap 21 via the aperture 22.

The plug 23 is fitted in the cavity 15. An anti-skid face (not numbered) is formed on the periphery of the plug 23. The anti-skid face of the plug 23 is in contact with a wall of the cavity 15 to keep the plug 23 firmly in the cavity 15.

The elastic element 24 is compressed between the plug 23 and the stop 26 of the rod 16 so that the elastic element 24 biases the rod 16 against the plug 23 to extend the contact section 25 from the anti-skid cap 21 through the aperture 22. The elastic element 24 is preferably a helical spring. The elastic element 24 can however be an elastomer or an air bag in another embodiment. Furthermore, the rod 16 is used to abut against an internal portion of anti-skid cap 21 to preventing the rod 16 from completely leaving the anti-skid cap 21 via the aperture 22. The positioning section 27 of the rod 16 is inserted in a section of the elastic element 24 to ensure smooth movement of the rod 16.

The telescopic device 20, which is connected to an end of the tube 10, renders the length of the strut adjustable to allow the contact section 25 of the rod 16 to firmly abut against various positions of the engine hood 55. Thus, the engine hood 55 can be kept at various angles according to the environment around the vehicle 50.

Figure 4:
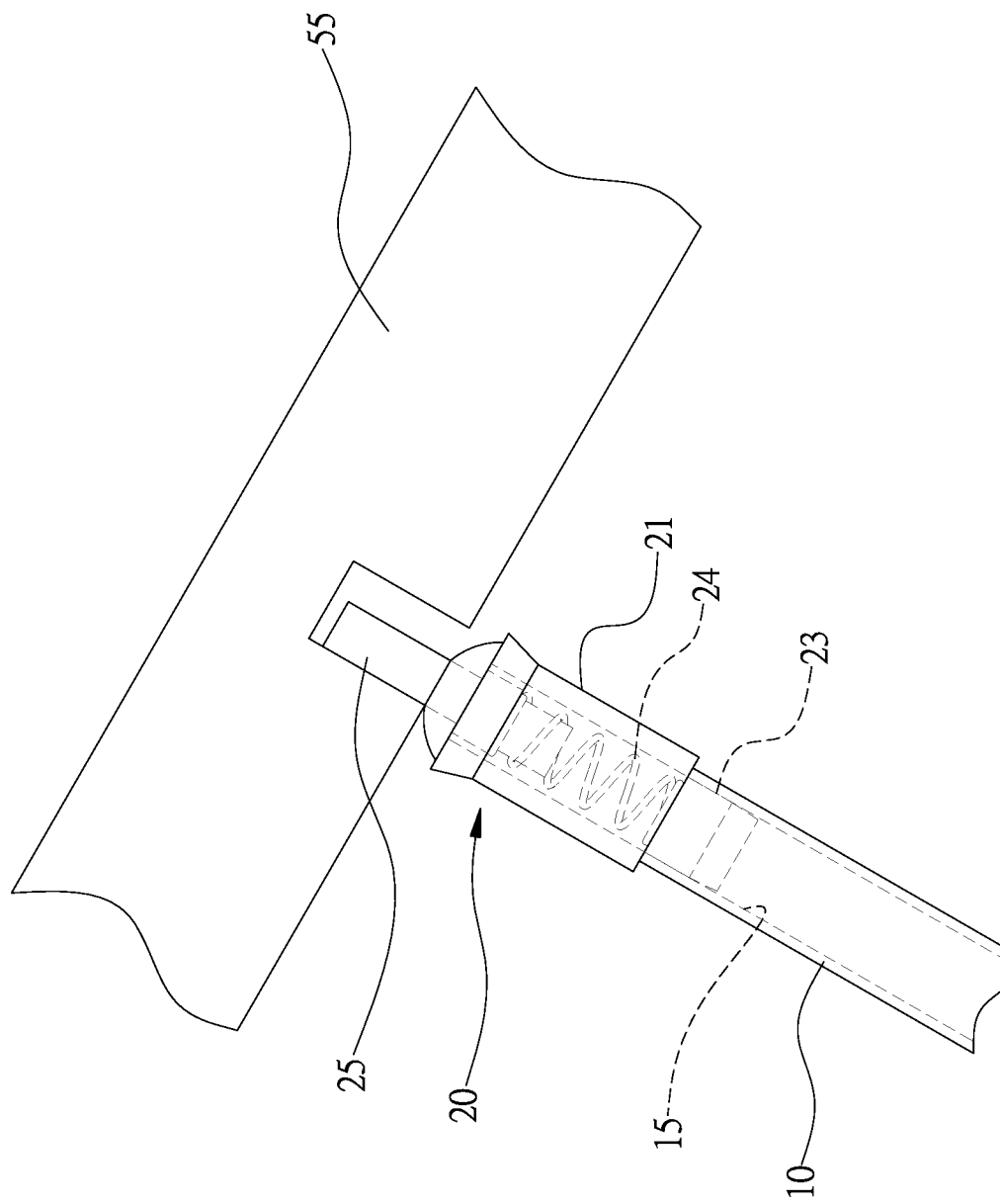
FIG. 4 is an enlarged partial view of the engine hood and the strut shown in FIG. 1.

Referring to FIG. 4, in operation, the lower end of the tube 10 abuts against a portion of the vehicle 50. Preferably, the upper end of the contact section 25 of the rod 16 is inserted in a recess (not numbered) made in a lower face of the engine hood 55. As described above, the elastic element 24 abuts against the stop 26 of the rod 16 to extend the contact section 25 of the rod 16 from the anti-skid cap 21. Therefore, an upper end of the anti-skid cap 21 firmly contacts the lower face of the engine hood 55.

Figure 5:
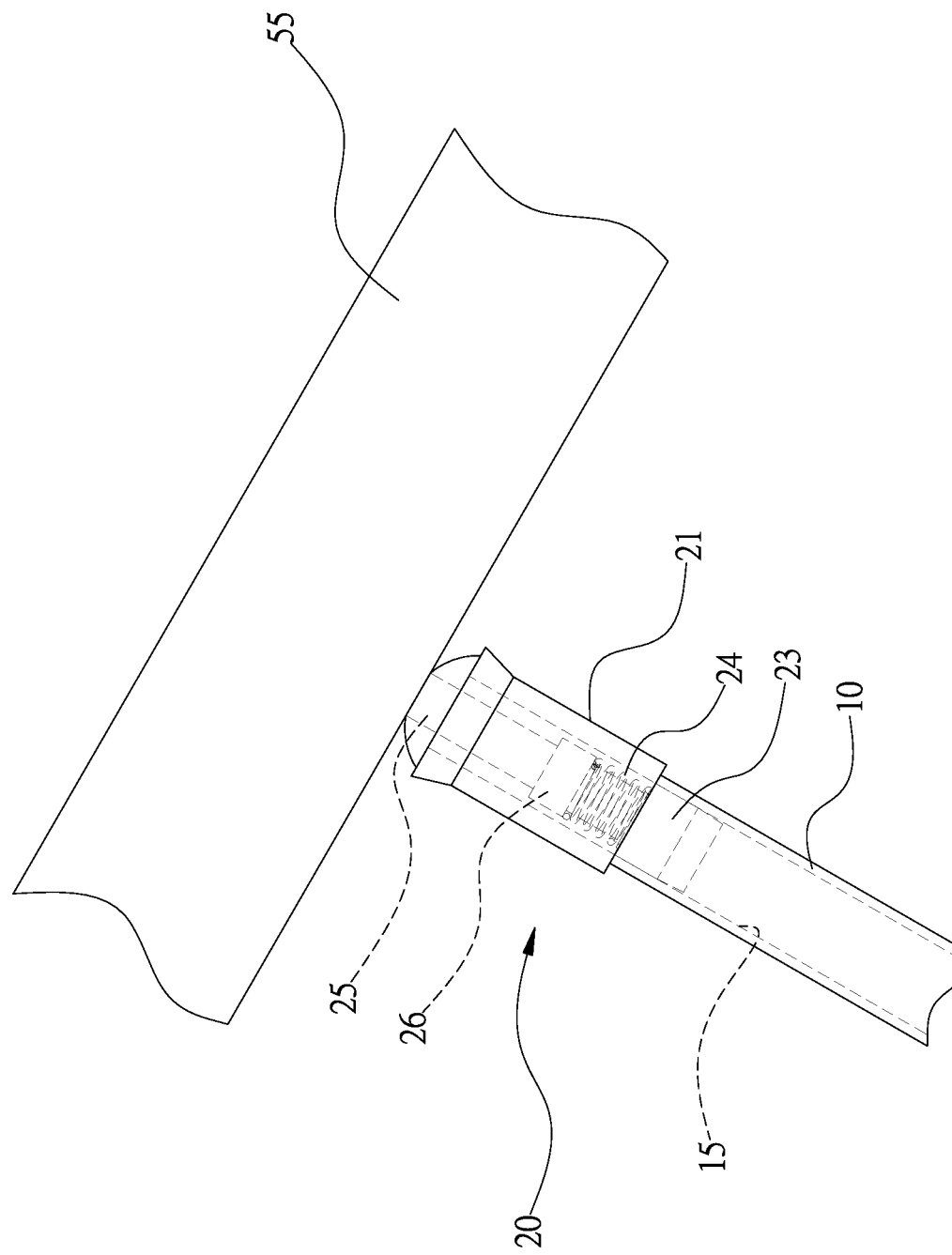
FIG. 5 is a side view of the engine hood and the strut in another position than shown in FIG. 4.

Referring to FIG. 5, in use, the lower end of the tube 10 abuts against a portion of the vehicle 50. Alternatively, the upper end of the contact section 25 of the rod 16 abuts against the lower face of the engine hood 55. The contact section 25 of the rod 16 is pushed completely into the anti-skid cap 21 so that the elastic element 24 is further loaded by the stop 26 of the rod 16. The upper end of the anti-skid cap 21 and the upper end of the rod 16 contact the lower face of the engine hood 55. The anti-skid cap 21 and the rod 16 are made of different materials with different values of hardness. Thus, there is adequate friction between the telescopic device 20 and the engine hood 55. Accordingly, the strut, which includes the tube 10 and the telescopic device 20, firmly keeps the engine hood 55 in a desired angle.

Figure 6:
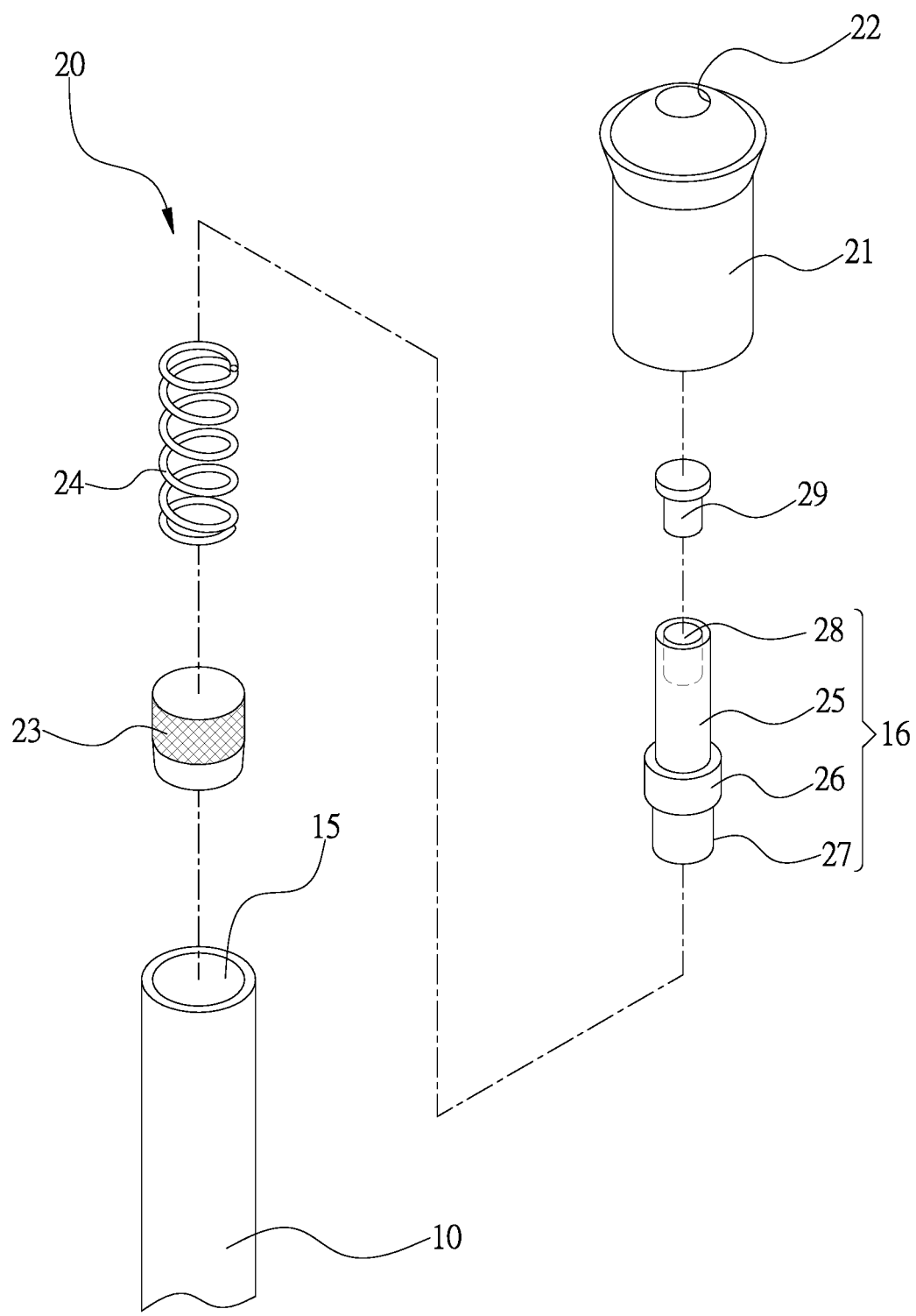
FIG. 6 is an exploded view of a strut in accordance with the second embodiment of the present invention.

Referring to FIG. 6, there is shown a strut according to a second embodiment of the present invention. The second embodiment is identical to the first embodiment except for two features. Firstly, the telescopic device 20 includes an additional anti-skid element 29. Secondly, the rod 16 includes a bore 28 made in an end. A reduced section of the anti-skid element 29 is fitted in the bore 28 so that the anti-skid element 29 is firmly connected to the rod 16. The anti-skid element 29 includes another section located above an upper end of the rod 16. The anti-skid element 29 is made of silicon, rubber or another proper material so that the anti-skid element 29 firmly contacts the engine hood 55 with adequate friction but without risks of scratching paint job on the engine hood 55.

Advantageously, the telescopic device 20 provides the strut with two modes. In the first mode, the contact section 25 of the rod 16 is inserted in the recess made in the engine hood 55, thereby firmly keeping the strut in position relative to the engine hood 55. In the second mode, the contact section 25 and the anti-skid cap 21 both contact the lower face of the engine hood 55, thereby firmly keeping the strut in position relative to the engine hood 55.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A strut comprising:
    a tube comprising a cavity;
    a telescopic device comprising:
        an anti-skid cap formed with an aperture and located on the tube to close the cavity so that the aperture is in communication with the cavity of the tube;
        a rod movably inserted in the anti-skid cap and the cavity of the tube; and
        an elastic element for biasing a section of the rod from the anti-skid cap via the aperture.

2. The strut according to claim 1, wherein the tube is a telescopic element including several sections connected to one another.

3. The strut according to claim 1, wherein the aperture of the anti-skid cap is made with a diameter smaller than that of the cavity, and the rod comprises a stop with a diameter larger than that of the aperture of the anti-skid cap to allow the stop to abut against the anti-skid cap to avoid movement of the rod completely out of the anti-skid cap.

4. The strut according to claim 3, wherein the telescopic device further comprises a plug fitted in the cavity of the tube, and the elastic element is compressed between the plug and the stop of the rod.

5. The strut according to claim 4, wherein the rod comprises a positioning section inserted in a section of the elastic element.

6. The strut according to claim 1, wherein the telescopic device further comprises an anti-skid element connected to an end of the rod.

7. The strut according to claim 6, wherein the rod further comprises a bore for receiving a section of the anti-skid element.

8. The strut according to claim 6, wherein the anti-skid element is selected from the group consisting of silicone and rubber.

* * * * *